A. RIEDLER.
PISTON ENGINE.
APPLICATION FILED JAN. 31, 1917.
1,259,292.
Patented Mar. 12, 1918.
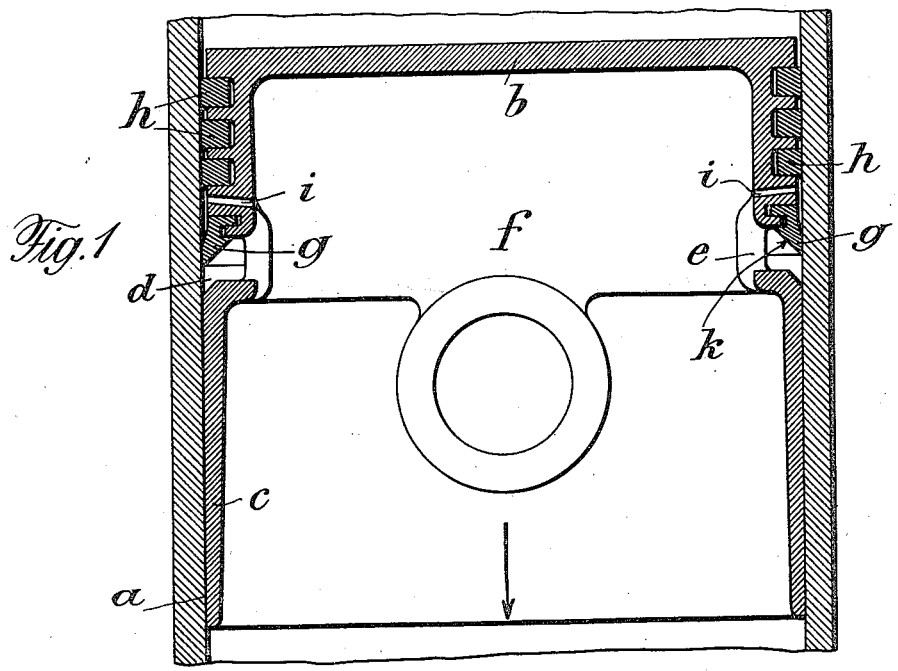
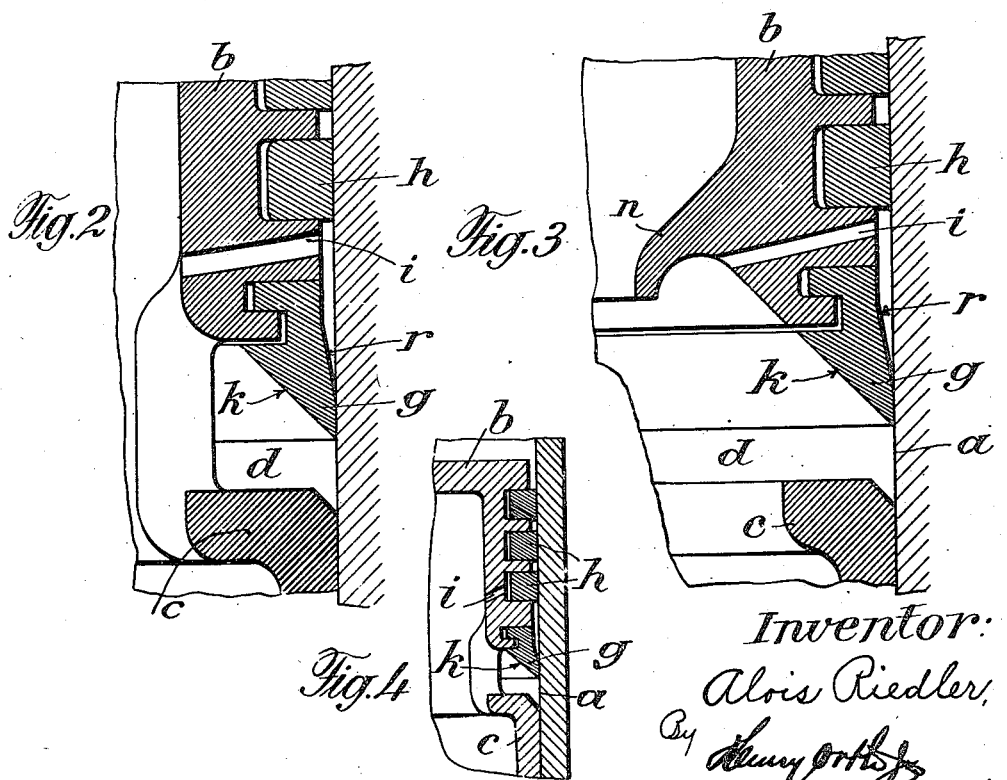
Inventor:
Alois Riedler,
By Henry Orth Jr.
atty.

UNITED STATES PATENT OFFICE.

ALOIS RIEDLER, OF BERLIN, GERMANY.

PISTON-ENGINE.

1,259,292.  Specification of Letters Patent.  Patented Mar. 12, 1918.

Application filed January 31, 1917. Serial No. 145,755.

*To all whom it may concern:*

Be it known that I, Dr. ALOIS RIEDLER, a subject of the Emperor of Germany, residing at No. 7 Rauchstrasse, Berlin, Germany, have invented certain new and useful Improvements in Piston-Engines; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The present invention has reference to improvements in piston engines, and relates more specifically to improvements in means for reducing and controlling the amount of lubricant used in lubricating the pistons of such engines, and the invention essentially consists in the construction, arrangement and coöperation of parts as hereinafter fully described and claimed.

As is well known, most of the piston engines, such as steam engines, internal combustion engines, compressors, and the like, are subject to a large consumption of piston lubricant, for the reason that the latter creeps past the piston along the cylinder surface into the working chamber, where it is apt to cause trouble before it is expelled with the motive medium.

Various attempts have been made to reduce and control the amount of lubricant entering the working chamber. In one such construction the tail portion of the piston has been separated partly or wholly from the packing ring supporting head portion, so that at this zone of interruption or gap the sliding surface of the cylinder is exposed toward the interior of the piston below the packing rings. In another construction, this gap has been arranged immediately in the rear of the outermost packing ring to have the latter push back the lubricant. The various constructions, however, operate all more or less unsatisfactorily, for the reason that they do not succeed in removing the lubricant from the cylinder surface, owing to its high adhesion resistance and the high, varying operative speed.

Moreover, the prior arrangements have the disadvantage that the minimum amount of oil required for preventing the packing rings from sticking, is not assured, and that the pushing-back of the lubricant by the pressure of the gases passing by the packing rings is seriously interfered with.

According to the present invention the lubricant, after having been used in lubricating the sliding surfaces, is deflected almost in its entirety and uninfluenced by the gas pressure obtaining between the respective sliding surfaces, from the cylinder sliding surface to the interior of the piston or to a splash-oil collector, and, further, the minimum amount of lubricant is continuously supplied to the packing rings.

My invention will best be understood, when described with reference to the accompanying drawings, in which—

Figure 1 represents a longitudinal section through part of a cylinder with piston, embodying my improvements;

Fig. 2 shows a detail part thereof, on an enlarged scale;

Fig. 3 illustrates a fragmental section through a modified construction; and

Fig. 4 shows a similar sectional elevation of still another modification.

Referring to Figs. 1 and 2 the piston —b— sliding on the cylinder surface —a— is provided in well known manner with an annular passage or gap —d— below the packing rings —h—, which passage communicates with the interior —f— of the piston through the apertures or spacing joints —e—. According to my improvements, I provide on the piston, in addition to the usual packing rings —h—, a spring ring —g— with an obliquely directed inner face —k— and a slightly outwardly curved face —r—, just above the passage —d—.

By reason of the thus presented knife-edge of the annulus —g— and its inclined face —k—, the oil, which has lubricated the working surface of the tail portion —c— of the piston and adheres to the cylinder wall —a—, is scraped-off in spite of its strong adhesive tendency and the high operative speed and is forced toward and into the piston interior —f—, and is thereby prevented from working its way into the pressure chamber of the cylinder. The oil pressure acting on the annular incline —k— of the ring —g— enhances in favorable manner the knife-like scraping action of the ring on the upstroke of the piston.

In case of imperfect operation of the packing rings —h—, excess pressure is apt to operate on the face —r— of the ring —g—, which would tend to compress the ring and render it useless for its purposes. The packing rings —h—, obviously, will stick or seize unless a sufficient amount of lubricant is supplied. According to this invention, these dangers are effectively obviated by the provision of passages —i— which perforate the piston-head wall between the above described scraper annulus —g— and the adjoining packing ring —h—. These passages, whose number and size vary according to requirements, allow the gases which escape by the packing rings to flow-off during the working stroke of the piston, so that the excess pressure on the ring face —r— is relieved. During the other cycles a certain amount of the oil which splashes up in the piston interior will pass through these ducts —i— and on to the packing rings.

To facilitate the introduction of oil into these ducts, the piston interior may be provided with an inverted trough-shaped oil catching annulus or hollow flange —n—, as shown in Fig. 3.

In the further modification, according to Fig. 4, the pressure equalizing passages —i— extend from the piston interior slantingly upward into the groove receiving the packing rings next to the oil-scraping annulus.

The invention described here for single acting plunger pistons, may, obviously, also be used in connection with double acting pistons.

What I claim is:

1. In a piston engine, a cylinder, a hollow piston therein, packing rings on said piston, means for conducting lubricant to the sliding surfaces of said piston including a circumferential gap adjacent the packing rings and exposed toward the piston interior, an expansible oil-scraping annulus extending into said gap and comprising an annular body, its upper portion lying flush with the outer circumference of the retaining piston wall, and its lower end extending slightly flaringly outward, presenting an annularly projecting knife-edge adapted to closely hug the cylinder wall, whereby said annulus forms a chamber with the cylinder wall vented by said means, substantially as set forth.

2. In a piston engine, a cylinder, a hollow piston, packing rings on said piston, and means adjacent said rings for conducting lubricant to the sliding surfaces of said piston including a circumferential gap exposed toward the piston interior, an expansible oil-scraping annulus extending into said gap and comprising an annular body, its upper portion lying flush with the outer circumference of the retaining piston wall, and its lower end extending slightly flaringly outward, presenting an annularly projecting knife-edge adapted to closely hug the cylinder wall, whereby a chamber is formed between said annulus and wall, and radially extending ducts in the piston wall above said oil-scraping annulus, for allowing the alternate passage of oil and gases to and from said chamber, substantially as set forth.

3. In a piston engine, a cylinder, a hollow piston, packing rings on said piston, and means adjacent said rings for conducting lubricant to the sliding surfaces of said piston including radial ducts and a circumferential gap exposed toward the piston interior, an expansible oil-scraping annulus extending into said gap and comprising an annular body, its upper portion lying flush with the outer circumference of the retaining piston wall, and its lower end extending slightly flaringly outward, presenting an annularly projecting knife-edge adapted to closely hug the cylinder wall, said radial ducts directed to allow the gases passing by the packing rings to escape into the piston interior during one stroke, and during the other strokes to cause lubricant to flow from the piston interior into the space between the piston and the cylinder wall, substantially as set forth.

4. In a piston engine, a cylinder, a hollow piston, packing rings on said piston, and means immediately below said rings for conducting lubricant to the sliding surfaces of said piston including a circumferential gap exposed toward the piston interior, an expansible oil-scraping annulus extending into said gap and comprising an annular body, its upper portion lying flush with the outer circumference of the retaining piston wall, and its lower end extending slightly flaringly outward, presenting an annularly projecting knife-edge adapted to closely hug the cylinder wall, radially extending ducts in the piston wall close to said oil-scraping annulus between the latter and the piston-head end, said radial ducts directed to allow the gases passing by the packing rings to escape into the piston interior during one stroke, and during the other strokes to cause lubricant to flow from the piston interior into the space between the piston and the cylinder wall, and splash-oil collecting and directing means in connection with the piston, internally thereof and close to said radially extending gas and oil ducts, substantially as set forth.

5. In an explosion engine, a cylinder, a trunk piston therein having a head portion with piston rings thereon and a tail portion free from rings, an annular passage through said piston between the head portion and the tail portion below the undermost of said rings, a resilient scraper ring having an annular, projecting knife-edge in the upper portion of said passage whose upper portion is flush with the piston surface and whose lower surface contacts with the cylinder wall, said piston having gas vents therethrough between the scraper ring and adjacent packing ring.

6. In an explosion engine, a piston having packing rings thereon and an annular passage therethrough adjacent the packing rings and having an internal curved splash directing surface inclined downwardly to said passage, and a resilient oil scraping ring in said passage having an inner beveled face forming a continuation of the splash directing face, and gas vents between the scraping ring and adjacent packing ring leading through the splash directing surface.

In testimony that I claim the foregoing as my invention, I have signed my name.

Dr. ALOIS RIEDLER.